United States Patent
Boyle

(10) Patent No.: US 6,279,054 B1
(45) Date of Patent: *Aug. 21, 2001

(54) ARBITRATOR FOR MULTIPLE PROCESSES SHARING A PORT

(75) Inventor: Adam Boyle, Otem, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/336,006

(22) Filed: Jun. 18, 1999

Related U.S. Application Data

(63) Continuation of application No. 08/882,195, filed on Jun. 25, 1997, now Pat. No. 5,938,745.

(51) Int. Cl.[7] .................................................. G06F 13/14
(52) U.S. Cl. ........................ 710/36; 710/40; 709/303; 379/93.01; 379/220; 379/229
(58) Field of Search ..................... 379/93.01, 220, 379/229; 709/303; 710/36, 40

(56) References Cited

U.S. PATENT DOCUMENTS

| | | | |
|---|---|---|---|
| 5,307,347 | * 4/1994 | Duault et al. | 370/439 |
| 5,442,691 | * 8/1995 | Price et al. | 379/220 |
| 5,471,522 | 11/1995 | Sells et al. | |
| 5,574,888 | 11/1996 | Panditji et al. | |
| 5,628,030 | 5/1997 | Tuckner. | |
| 5,671,442 | * 9/1997 | Feeney et al. | 710/14 |
| 5,675,831 | 10/1997 | Caputo. | |
| 5,699,414 | 12/1997 | Telibasa. | |
| 5,790,895 | 8/1998 | Krontz et al. | |
| 6,038,309 | * 3/2000 | Ram et al. | 379/229 |

OTHER PUBLICATIONS

IBM Technical Disclosure Bulletin, "Method of monitoring open files for any application on a personal computer", vol. 29, No. 7, Dec. 1986, p.2966–2968.*

Eves, Ken, "Unofficial FAQ about ip_masquerade for Linux" [online], Jan. 1996 [retrieved 2000-7-6], Retrieved from the Internet <URL:http://www.indyramp.com/masq/ip_masquerade.txt>.*

* cited by examiner

Primary Examiner—Thomas Lee
Assistant Examiner—Tammara Peyton
(74) Attorney, Agent, or Firm—Blakely, Sokoloff, Taylor & Zafman LLP

(57) ABSTRACT

A method and apparatus for arbitrating access to a shared resource in a system that does not support shared process space. An arbitrator process watches a port for an incoming call having associated therewith an identification string. When an incoming call is received, the identification string of the incoming call is compared to a set of identification strings corresponding to applications listening for an incoming call. If a matching string is located, the arbitrator process duplicates the handle to the port and passes the duplicated handle to the application corresponding to the matching string.

9 Claims, 4 Drawing Sheets

ARBITRATOR FOR MULTIPLE PROCESSES SHARING A PORT

This application is a continuation of Ser. No. 08/882,195 filed Jun. 25, 1997 now U.S. Pat. No. 5,938,745.

BACKGROUND OF THE INVENTION

(1) Field of the Invention

Arbitration of access to a shared resource. More specifically, arbitration of access to a shared communication port in a system not supporting shared process space.

(2) Related Art

Any time a resource is shared between multiple applications, some form of arbitration is required. A classic type of shared resource is a communication port permitting access to a modem line which carries incoming and outgoing calls to or from one or more applications operating on a host system. It is important that an incoming call is delivered to the correct target application. In systems with operating systems that permit shared process space, such as 16 bit Windows, the arbiter has been instantiated as a dynamic link library (DLL) accessible by all interested applications. This was possible because process space, libraries, memory and variables could all be shared by different applications. Thus, an incoming call was readily routed by the DLL to a correct target application.

Unfortunately for the arbitrator, with the development of 32 bit operating systems such as Windows NT and Windows 95 sharing of process space is no longer permitted. Because DLLs are now loaded into separate process spaces, the arbitrator can not easily be a DLL in itself. If it were, each application using the arbitrator would load its own separate copy of the arbitrator, and each copy of the arbitrator would have to interact with other copies of itself.

However, having the arbitrator as a separate process creates problems, too. As a separate process, the arbitrator cannot communicate as easily as a DLL can with an application. Some form of inter-process communication (IPC) would be needed, instead of the easier method of calling application programming interface (API) functions in a DLL. Thus, the arbitration issues arise again.

Some efforts have been made through APIs to address this issue. These efforts have generally failed to yield satisfactory results. For example, Microsoft's telephony application programming interface, TAPI, provides rudimentary arbitration. Specifically, assuming a system in which five applications are listening for a call, the application first in time will be handed an incoming call. If that application determines the call is not for it, it bears the responsibility of returning the call to TAPI, which will then forward it on to the next application in time. Thus, if a call is directed to the fifth application to listen on the port, if any of the first four applications fail to hand the call-back off to TAPI, the correct target application will never receive the call. Additionally, TAPI is only supported by Windows NT 4.0 and Windows 95 and later versions. Earlier versions have no arbitration support.

In view of the foregoing, it would be desirable to be able to arbitrate access to a modem port to insure reliable message delivery and to permit outgoing calls at appropriate times.

BRIEF SUMMARY OF THE INVENTION

A method and apparatus for arbitrating access to a shared resource in a system that does not support shared process space is disclosed. An arbitrator process watches a port for an incoming call having associated therewith an identification string. When an incoming call is received, the identification string of the incoming call is compared to a set of identification strings corresponding to applications listening for an incoming call. If a matching string is located, the arbitrator process duplicates the handle to the port and passes the duplicated handle to the application corresponding to the matching string.

DETAILED DESCRIPTION OF THE INVENTION

Figure 1:
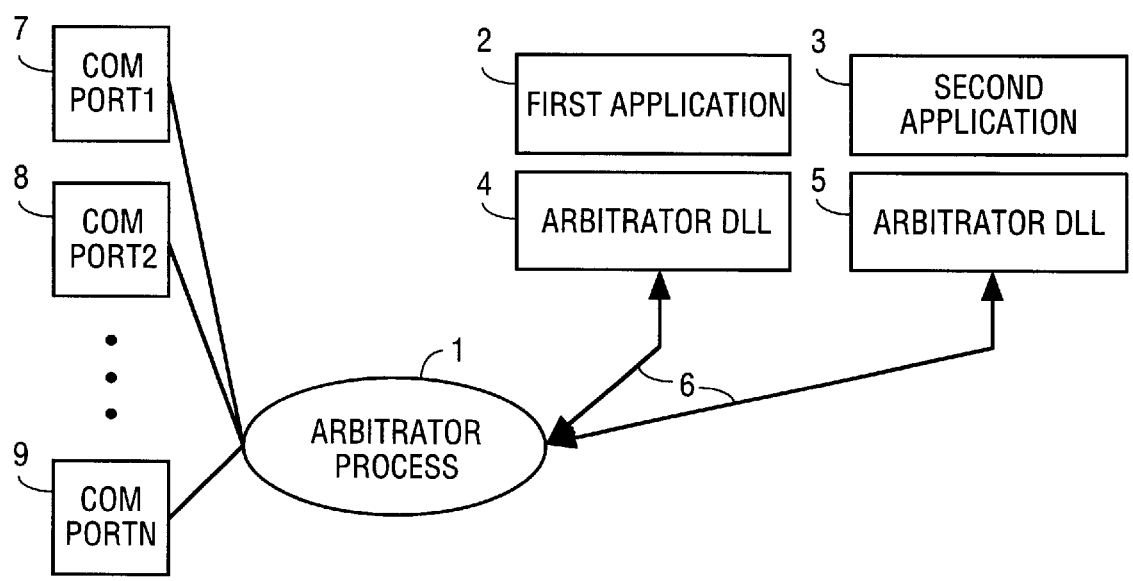
FIG. 1 is a block diagram of one embodiment of the invention of an arbitrator process existing in its own process space.

FIG. 1 is a block diagram of one embodiment of the invention. An arbitrator process 1 exists in its own process space. A first application 2 has associated therewith an instantiation arbitrator DLL 4. Similarly, a second application 3 has associated therewith an instantiation arbitrator DLL 5. The arbitrator DLLs 4 and 5 may be identical copies of each other. The first and second applications 2 and 3 and the respective arbitrator DLLs 4 and 5 communicate with the arbitrator process 1 via interprocess communications 6. The arbitrator process 1 is responsible for arbitration of access to a shared resource, for example, communication ports (COM ports or ports). The number of applications with associated DLLs communicating via interprocess communication 6 with the arbitrator process 1 can be arbitrarily large. Two applications are shown in FIG. 1 for illustration only.

The first arbitrator DLL 4, 5 that finds that the arbitrator process 1 is not loaded will load the arbitrator process 1. An arbitrator DLL 4, 5 identifies whether the arbitrator process 1 is loaded by trying to contact the arbitrator process 1 to register its application 2, 3 with the arbitrator process 1. Once the arbitrator process 1 is loaded, the arbiter DLL 4, 5 will attempt to re-register its application 2, 3 with the arbitrator process 1.

Upon loading, the arbitrator process 1 attempts to open all available COM ports 7–9. Once the arbitrator process has successfully opened a COM port 7–9, no other application can use the port without going through the arbitrator process 1. Of course, if an application is already in control of a COM port, the arbitrator process can not open it. Accordingly, the arbitrator process periodically checks for the availability of any COM ports it has not yet acquired. Some ports may never become available to the arbitrator process and, accordingly, will not be available to applications 2, 3 using the arbitrator process 1 to access ports 7–9. One such example is where the COM port is connected to a mouse.

Once the arbitrator process 1 has successfully opened a number of ports 7–9, it initiates inbound and outbound calls and hands off the ports 7–9 to appropriate applications 2, 3. Because the shared process space is not permitted, handles to the ports cannot be shared. The arbitrator process 1 can, however, duplicate the handle. For example, in a WIN 32 system, the WIN 32 application programmer interface (API) "DuplicateHandle" can be used to duplicate the handle to a COM port. The duplicated handle can then be passed to another application 2, 3. Here, the arbitrator process 1 passes the duplicated handle to the instance of the arbitrator DLL associated with the application to whom the port should be given. The arbitrator DLL 4, 5 calls the WIN 32 API SetupComm, with the handle and parameters appropriate to the application 2, 3 and passes the handle to its parent thread. In this manner, the calling application 2, 3 can read or write to the COM port without the arbitrator process 1 controlling the port. Until the application 2, 3 releases the port and the arbitrator process 1 regains control, the port is considered in use, and the arbitrator process 1 periodically checks for its availability. In this manner, the arbitrator process 1 insures that if the application 2, 3 transacting on the port fails, the arbiter process can regain control of the port even though the application did not notify the arbiter process that the port had been released.

In one embodiment, the arbitrator process also provides support for non-compliant applications (NCAs). NCAs are those applications having no arbitrator DLL associated therewith. Handling of NCAs permits a certain amount of backward compatibility. Particularly, the arbitrator process permits the user to temporarily dearbitrate any COM port by making an appropriate selection in a dialog box. Once arbitration is disabled, the non-compliant application is free to access the port either to listen for an incoming call or generate an outgoing call. Moreover, if the system uses TAPI or a TAPI simulator, and the arbitration process recognizes that an incoming call is not for any arbitrated application, the arbitration process will perform a TAPI style handoff so that the call can get to a downstream port requester.

Figure 2:
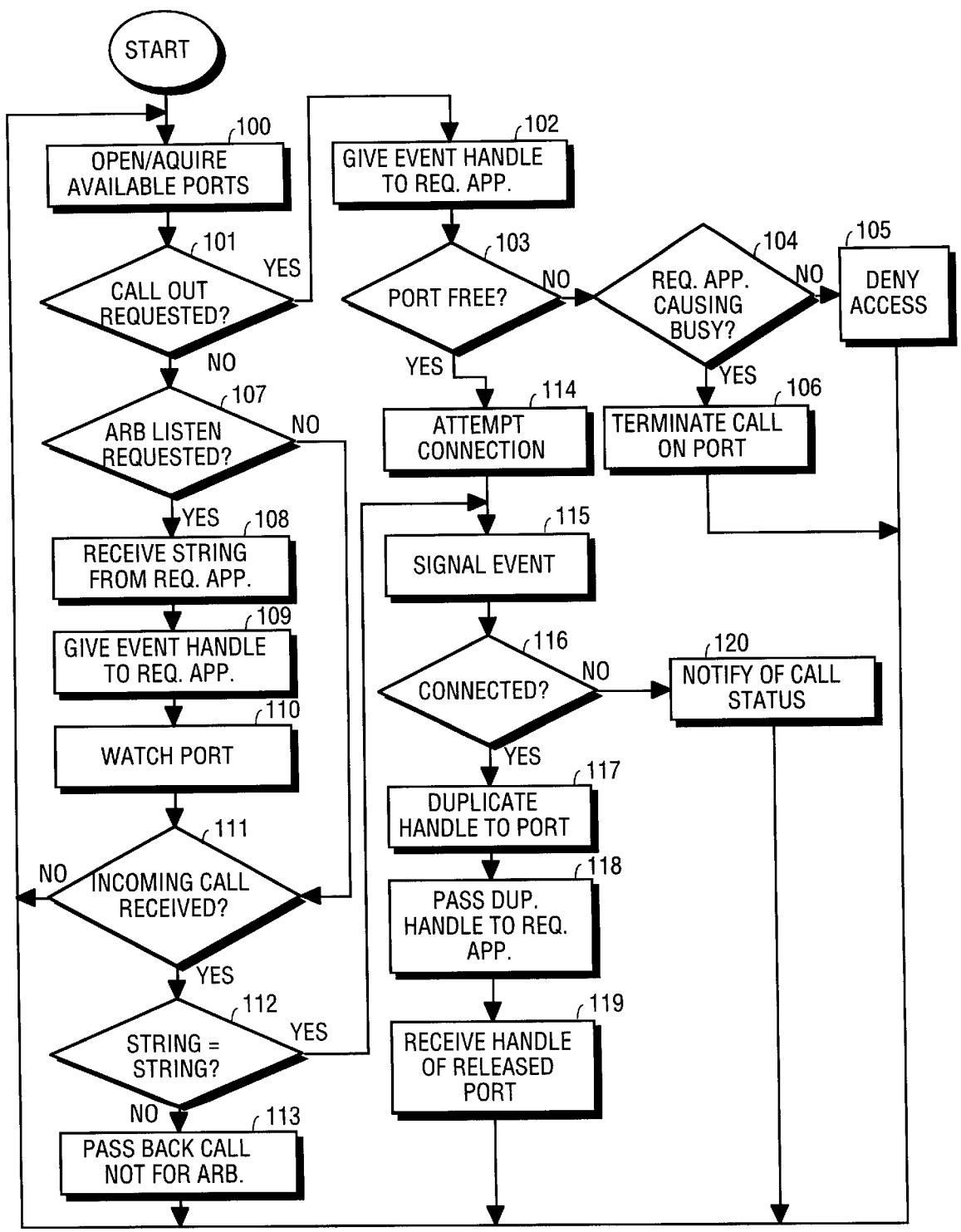
FIG. 2 is a flowchart of the arbitration scheme in one embodiment of the invention from the arbitrator process perspective.

FIG. 2 is a flowchart of the arbitration scheme in one embodiment of the invention from the arbitrator process perspective. At functional block 100, the arbitrator process opens or acquires all available ports. Once the arbitrator process has acquired all the available ports, other applications cannot access the ports without going through the arbitrator process.

At decision block 101, a determination is made whether a call out has been requested. If a call out has been requested by an application, the arbitrator process gives an event handle to the application at function block 102 and then determines if the requested port is free at decision block 103. A requested port is considered free if no application is conducting a transaction on the port at the time of the call out request. Listening on the port is not considered a transaction. If the port is free, the arbitrator process will attempt to connect the requested outgoing call at functional block 114. Assuming the port is granted for an outgoing call (as discussed below), no incoming call will be received on the granted port while the outgoing transaction is occurring. Once the port is released back to the arbitrator process (or the arbitrator process reacquires the port), the arbitrator process continues listening for all the applications that were listening on the port before it was granted for the outgoing transaction.

If the requested port is not free, a determination is made at decision block 104 whether the requesting application is the application causing the port to be busy. If the requesting application is the application causing the port to be busy, it is presumed that some error has occurred because it is presumed that the application would not request a port it is using. Therefore, the call on the port will be terminated by the arbitrator process at functional block 106, rendering the port available. Rather than denying access if the application is using a port it requests to dial out on, the arbitrator process will terminate the other transaction to free the port. Some embodiments support a wild card indicator which requests access on all ports (any available port). In multi-threading applications, care must be taken in using any supported wild card indicator for all ports, as such call may cause the termination of an ongoing transaction of another thread. Once the outgoing transaction is terminated, the port can be reclaimed by the arbitrator process and allocated to a waiting application. If at decision block 104 the requesting application is not the application causing the port to be busy, the application is denied access to the port at functional block 105.

If no call out has been requested at decision block 102, a determination is made at decision block 107 whether a listen on a port has been requested. If a listen has been requested at decision block 107, the requesting application sends a string to the arbitrator process. The arbitrator process receives the string from the requesting application at functional block 108. In turn, the arbitrator process gives an event handle to the requesting application at functional block 109.

The arbitrator process then watches the port for incoming calls at functional block 110. After a period of time or when a call comes in, the arbitrator process determines that it has or has not received an incoming call at decision block 111. If an incoming call has been received, the arbitrator process attempts to match an incoming string to the string or strings of listening applications at decision block 112. In one embodiment, the arbitrator process transitions through a series of states corresponding to each character of the string. If any character does not match up between the strings, the arbitrator process immediately transitions to a no match state as to that string pair.

If the string does not match any string of a listening application, the arbitrator process passes the call-back as not being for any arbitrated application at functional block 113 (e.g., performs a TAPI style handoff). If a string match occurs at decision block 112, the arbitrator process signals the event (the handle of which previously was given at functional block 109) in the application corresponding to the matching string, at functional block 115. An event is also signaled after connection is attempted (this is the event corresponding to the handle given at functional block 102). After the event is signaled at functional block 115, an implicit determination of connection is made at decision block 116. If connected, the arbitrator process duplicates the handle to the port at functional block 117, passes the duplicated handle to the requesting application at functional block 118, and ultimately receives the handle of the released port at functional block 119. If the application crashes while using the port, functional block 119 will not occur, but the port will still be reclaimed in the periodic reacquisition of functional block 101. If the call is not connected at decision block 116, the requesting application is notified of the call status at functional block 120.

Figure 3:
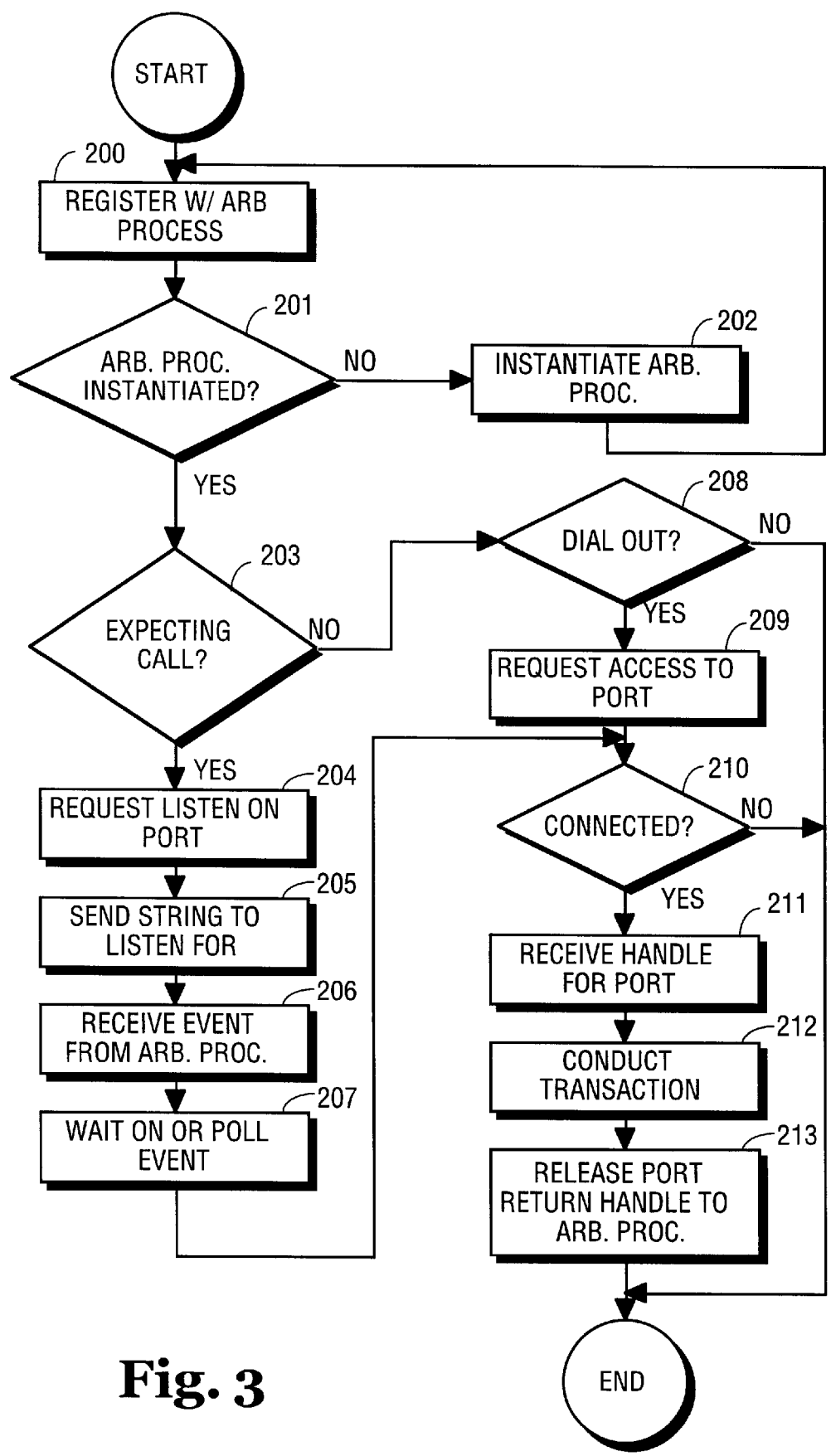
FIG. 3 is a flowchart of one embodiment of the instant invention from the application perspective.

FIG. 3 is a flowchart of one embodiment of the instant invention from the application perspective. At functional block 200, the application attempts to register with the arbitrator process. An application must register with the arbitrator process regardless of whether it intends to dial out or just listen. To register a function call, "arbiterRegister" is used. Assuming no errors occur, this function call opens communications between the applications arbitrator DLL and the arbitrator process. Possible errors include already registered, arbitrator process failed to load, e.g., does not exist, out of memory, or an allowed maximum number of registrants has been exceeded.

At decision block 201, a determination is made that the arbitrator process is instantiated based on the success of the arbiterRegister call. If the registration was successful, the arbitrator process is clearly instantiated. If the arbiterRegister failed at functional block 202, the DLL associated with the application instantiates the arbitrator process. The arbitrator process will not permit itself to be instantiated twice, so if the arbitrator process has already been loaded, the attempt to instantiate the arbitrator process will fail. The application then tries to re-register with the arbitrator process.

Once a determination has been made at decision block 201 that the arbitrator process has been instantiated, if at decision block 203 the application is expecting a call, it will request a listen on a port at functional block 204. At functional block 205, a string is sent to the arbiter process for use in identifying an incoming call which should be directed to the application. In response to the arbitrator process 1 receiving the string, the arbitrator process gives an event handle to the application. At functional block 206, the application receives the event from the arbiter process.

In one embodiment, functional blocks 204–206 are effected by a call to the function arbiterListen passing parameters identifying the port(s) on which listening is desired, an identification string to be matched to an incoming call, a length identifier identifying the length of the identification string, and a pointer to an event handle to be signaled if the matching call arrives. This event is also signaled if the arbitrator process fails or some other critical error occurs. Once the arbitrator process receives this function call, it will check the specified port(s) for incoming calls matching the provided identification string until the application unlistens, even if the application dials out. Moreover, a single application may call this function multiple times with multiple different strings and may specify the same or different ports. In one embodiment, an all-ports "wild card" identifier is provided to request a listen on all available ports. The function arbiterUnlisten, by passing the pointer to the event handle used with the arbiterListen function, causes the arbitrator process to stop listening for the identification string previously sent.

While listening, the application will wait on or poll the event at functional block 207. This may take the form of spawning a thread whose sole purpose is to watch the event. When the event is signaled, the application checks to determine if connection of the requested transaction caused the event to be signaled. At decision block 210, if it did, the application receives the duplicated handle for the port which has been duplicated by the arbitrator process.

In one embodiment, the application calls the arbiterGetEventInformation function with the parameters of the handle to the signaled event and a pointer to the call handle. If the return value indicates either an incoming or outgoing call, the associated arbitrator DLL will cause the duplicated handle of the port to be referenced by the pointer to the call handle. If an error or busy signal is indicated by the return value, the arbitrator DLL ensures that the pointer to the call handle references a null value.

Once connected, the application receives a handle to the port from the arbitrator process at functional block 211. The application is then free to conduct a transaction on the port at functional block 212. In one embodiment, the application manages all reads and writes using standard WIN 32 read/write functions associated with CreateFile( ). In this embodiment, CreateFile( ) should never be used on handles passed to the application by the arbitrator process since the handles are already open. Additionally, CloseHandle( ) should never be used on any arbitrator process COM port handle. It is recommended that reading and writing to a COM port be done with overlapped file input/output (I/O).

When the transaction is complete, the application releases the port and returns the handle to the arbitrator process at functional block 213. If the application has already placed all its listen requests and the application desires to dial out, an implicit decision is made at decision block 208. The application then requests access to the port at functional block 209. In one embodiment, this request takes the form of a call to an arbiterDial function passing an indication of the port(s) on which the application wants to dial out, the phone number to be dialed, and a pointer to an event handle to be signaled if a port is available and the call will be attempted. This function call may return a number of errors including: invalid device; device busy; invalid format of dial string; no arbitrator process availability time out; and unknown error. This is an asynchronous function call and a return of no error indicates only that the call will be attempted, not that the call was successful. The calling thread then must wait for the event to be signaled to proceed with the call.

A determination is made at decision block 210 if connection had been achieved. Once connected, the application will receive a duplicate handle for the port at functional block 211 and may conduct its outgoing transaction at functional block 212 before releasing the port at functional block 213. If the request is not granted, the application may re-request the port or a different port and will be granted access as ports become available.

The following tables provide an example of the sequence of events in an incoming and outgoing transaction, respectively.

| APPLICATION | ARBITRATOR (already loaded) | INCOMING CALL |
|---|---|---|
| 1) Registers with Arbitrator | | |
| 2) Requests incoming calls and passes "MyApp" string | | |
| | 3) Assigns Event Handle to App | |
| 4) Waits on Event | | RING |
| | 5) Answers phone | |
| | 6) Connect | 6) Connect |
| | | 7) Sends "MyApp" |
| | 8) Receives "MyApp" | |

-continued

| APPLICATION | ARBITRATOR (already loaded) | CALL |
|---|---|---|
| | 9) Checks for app registered with "MyApp" string (and finds it) | |
| | 10) Duplicates COM handle and passes it to application | |
| 11) Arbitrator DLL receives COM handle and passes it to application | | |
| 12) Sends/receives data Sends/receives data | ←→ | 12) |
| 13) Call terminated | | |
| 14) Notifies Arbitrator that call is finished | | |
| | 15) Arbitrator closes/reopens port | |

| APPLICATION | ARBITRATOR (already loaded) | CALL |
|---|---|---|
| 1) Registers with Arbitrator | | |
| 2) Calls Dial with "1-800-CONNECT" and requests com1 | | |
| | 3) Com1 is busy. Denies request | |
| 4) Calls Dial with "1-800-CONNECT" and requests com2 | | |
| | 5) Com2 is okay. Initiates call | |
| | 6) Brings up Status Dialog saying "Dialing 1-800-CONNECT" | |
| | | 7) RING |
| | | 8) ANSWER |
| | 9) Connect | 9) Connect |
| | 10) Returns CONNECTED to Application | |
| 11) Receives CONNECTED | | |
| 12) Gets Com2 handle from Arbitrator | | |
| 13) Sends/receives data Sends/receives data | ←→ | 13) |
| 14) Call terminated | | |
| 15) Notifies Arbitrator that call is finished | | |
| | 16) Arbitrator closes/reopens port | |

Figure 4:
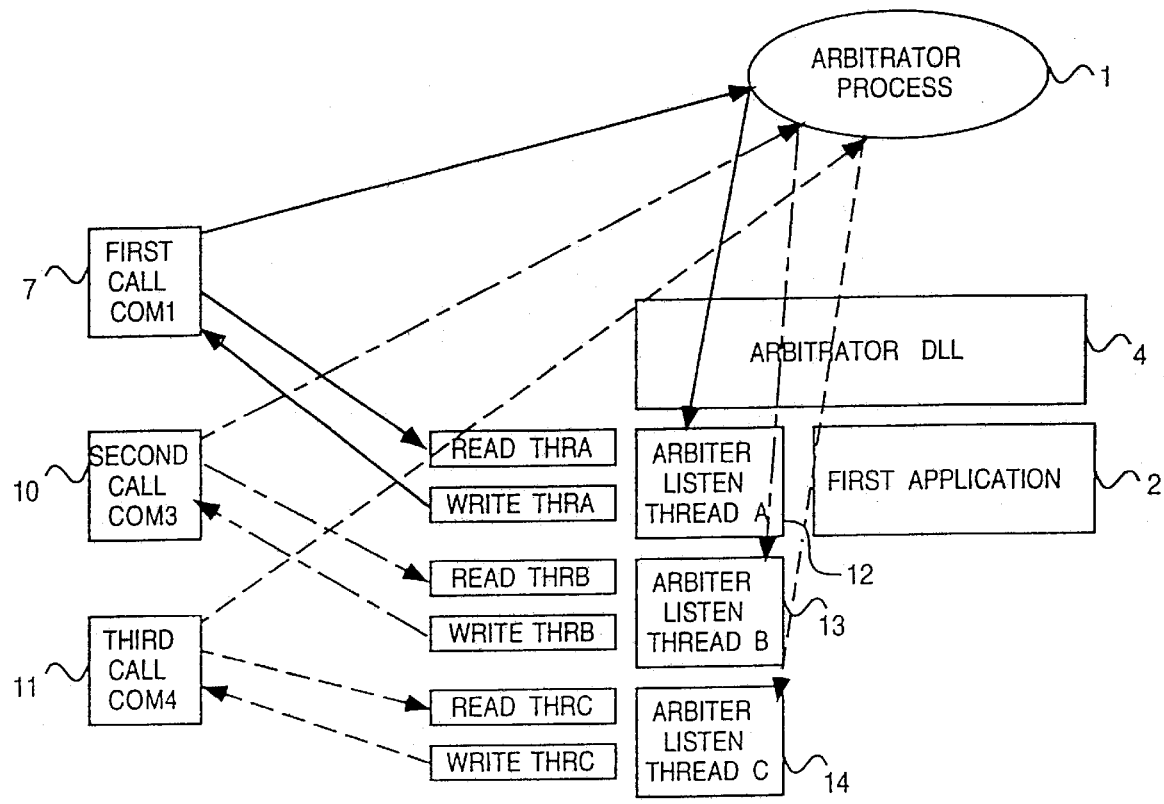
FIG. 4 is a block diagram showing multi-threading in one embodiment of the invention.

FIG. 4 is a block diagram showing multi-threading in one embodiment of the invention. As mentioned above, it is possible for a single application to handle multiple incoming and outgoing calls on different ports using different threads. An arbitrator process 1 has successfully opened and acquired a first COM port 7, a third COM port 10, and a fourth COM port 11. First, application 2 which is associated with instantiation of arbitrator DLL 4 spawns arbiterListen threads 12, 13, and 14, thread A, thread B, and thread C, respectively. These threads may request the arbitrator process to listen for their string on any or all available ports. In the shown diagram, thread A's string was received on the first COM port 7. The arbitrator process passes the duplicate handle to the first COM port 7 through arbitrator DLL 4 to thread A, which in turn spawns read thread A and write thread A to communicate directly with the first COM port 7. The arbiterListen thread A 12 is disabled while the transaction is occurring. In other words, arbiterListen thread A does not listen on other ports while its spawned threads read thread A and write thread A are conducting a transaction on the first COM port. Once the transaction is complete, arbiterListen thread A 12 continues listening on whatever COM port it passed in the original function call. This will continue until Thread A unlistens. An analogous procedure occurs with respect to threads B and C, respectively, with communications being set up on the third COM port 10 and the fourth COM port 11, respectively.

In one embodiment of the invention, a number of other functions may be called by the application to effect the ports. Among these functions are: i) arbiterGetStatus which returns status information about designated ports; ii) arbiterConfigurationDialog which causes the arbitrator process to display a dialog box which permits the specified device to be configured. For example, the dialog box permits setting of modem type, speed, parity, etc.; iii) arbiterReopenDevice reopens a device that had been shut down; and iv) arbiterReinitDevice reinitialized a specified device.

In one embodiment, the arbitrator process supports TAPI if it exists and attempts to simulate TAPI where it does not exist. This is done by loading a TAPI simulator DLL. This permits the arbitrator process to distinguish between types of incoming calls, e.g., FAX, voice, ISDN, etc. This also facilitates the ease of writing applications because TAPI ensures that a given application will work with a variety of hardware and configurations.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

I claim:

1. A method comprising:

arbitrating access to a modem by matching an identification string from an incoming call received on a port with at least one string of a set of identification strings associated with a listening application; and passing a handle for the port to a first application associated with the matching identification string.

2. The method of claim 1 further comprising:

receiving from each listening application at least one identification string for which the application is listening.

3. The method of claim 1 further comprising:

identifying which of a plurality of ports should be watched for the identification string.

4. The method of claim 1 further comprising:

accepting an access request to the port from an application;

determining if the port is busy;

duplicating and passing a handle of the port to the application if the port is not busy; and denying access to the port if the port is busy.

5. The method of claim 4 further comprising:

determining if an application causing the port to be busy is the application requesting access to the port;

clearing the port if the application causing the port to be busy is also the requesting application; and regranting the application access to the port.

6. An apparatus comprising:

a processor; and a memory coupled to the processor, the memory configured to cause the processor to arbitrate access to a modem by matching an identification string received from applications waiting for a call on a port to an identification string of an incoming call, and the memory further configured to cause the processor to pass a handle to the port to an application from which a matching identification string was received.

7. The apparatus of claim 6 wherein the memory is further configured to permit an application to conduct an outgoing transaction on the port if the port is not busy.

8. The apparatus of claim 7 wherein the memory is configured to clear the port if an application requesting an outgoing transaction is also the application causing the port to be busy.

9. An apparatus comprising:

a port;

a plurality of applications sharing the port; and means for arbitrating access to a modem, wherein the means for arbitrating includes:

means for accepting an identification string from an application seeking to listen on the port;

means for matching the identification string with an incoming string of an incoming call; and means for granting access to the port to an application whose identification string matches the incoming string.

* * * * *